(12) United States Patent
Toguyeni

(10) Patent No.: US 10,406,577 B2
(45) Date of Patent: Sep. 10, 2019

(54) IMPROVING THE BENDING BEHAVIOUR OF MECHANICALLY-LINED RIGID PIPE

(71) Applicant: Acergy France SAS, Suresnes (FR)

(72) Inventor: Gregory Alexandre Toguyeni, La Garenne-Colombes (FR)

(73) Assignee: Acergy France SAS, Suresnes (FR)

( * ) Notice: Subject to any disclaimer, the term of this patent is extended or adjusted under 35 U.S.C. 154(b) by 0 days.

(21) Appl. No.: 15/538,193

(22) PCT Filed: Dec. 18, 2015

(86) PCT No.: PCT/IB2015/002551
§ 371 (c)(1),
(2) Date: Jun. 20, 2017

(87) PCT Pub. No.: WO2016/103038
PCT Pub. Date: Jun. 30, 2016

(65) Prior Publication Data
US 2017/0341119 A1 Nov. 30, 2017

(30) Foreign Application Priority Data
Dec. 24, 2014 (GB) .................................. 1423227.6

(51) Int. Cl.
*F16L 9/00* (2006.01)
*B21C 37/15* (2006.01)
(Continued)

(52) U.S. Cl.
CPC ............ *B21C 37/154* (2013.01); *B21D 39/04* (2013.01); *F16L 1/203* (2013.01); *F16L 9/02* (2013.01); *F16L 58/08* (2013.01); *F16L 58/1081* (2013.01)

(58) Field of Classification Search
CPC .......... F16L 9/02; F16L 58/08; B21C 37/154; B21D 39/04
(Continued)

(56) References Cited

U.S. PATENT DOCUMENTS 2,516,689 A * 7/1950 France .................. B21C 37/154
138/143
3,562,887 A 2/1971 Schroeder et al.
(Continued)

FOREIGN PATENT DOCUMENTS

DE 102010044463 3/2012
GB 2476457 6/2011
(Continued)

OTHER PUBLICATIONS

API Specification 5L, "Specification for Line Pipe," American Petroleum Institute, Dec. 2012.
(Continued)

*Primary Examiner* — James F Hook
(74) *Attorney, Agent, or Firm* — Levy & Grandinetti

(57) ABSTRACT

A method of making mechanically-lined pipe with primary expansion by plastically expanding a liner sleeve within an outer pipe, under lining pressure applied internally to the liner sleeve. On relieving the lining pressure, elastic radial contraction of the outer pipe makes a mechanical bond between the outer pipe and the liner sleeve. Then, secondary expansion of the outer pipe is performed under fixing pressure, which may be greater than the lining pressure, applied internally to the liner sleeve at an end portion of the pipe. This makes or strengthens a mechanical bond at the end portion. The resulting pipe joint has an end portion and a body portion inboard of the end portion. The body portion has a first, lesser bonding pressure between the outer pipe
(Continued)

and the liner sleeve. The end portion has a second, greater bonding pressure between the outer pipe and liner sleeve.

7 Claims, 4 Drawing Sheets

(51) Int. Cl.
  *B21D 39/04* (2006.01)
  *F16L 58/10* (2006.01)
  *F16L 1/20* (2006.01)
  *F16L 9/02* (2006.01)
  *F16L 58/08* (2006.01)

(58) Field of Classification Search
  USPC .................................. 138/138, 139, 143
  See application file for complete search history.

(56) References Cited

U.S. PATENT DOCUMENTS

| | | | | |
|---|---|---|---|---|
| 3,598,156 | A * | 8/1971 | Ulmer | F16L 9/02 138/140 |
| 4,069,473 | A | 1/1978 | Vitaliev et al. | |
| RE30,802 | E * | 11/1981 | Rogers, Jr. | B21D 22/105 138/98 |
| 4,300,275 | A * | 11/1981 | McLaughlin | B21C 37/154 138/143 |
| 4,388,752 | A * | 6/1983 | Vinciguerra | B21D 39/04 138/147 |
| 4,556,240 | A | 12/1985 | Yoshida | |
| 4,580,426 | A * | 4/1986 | Zafred | B21D 39/06 29/421.1 |
| 4,598,857 | A * | 7/1986 | Matsui | B23K 20/001 156/86 |
| 4,784,311 | A * | 11/1988 | Sugao | B21C 37/06 138/142 |
| 4,823,847 | A * | 4/1989 | Grosse | B21C 37/06 138/143 |
| 5,259,547 | A * | 11/1993 | Hardwick | B23K 20/085 228/107 |
| 5,664,327 | A * | 9/1997 | Swars | B21D 39/04 29/421.1 |
| 6,050,301 | A * | 4/2000 | Yoshida | B21C 23/22 138/142 |
| 2003/0094209 | A1* | 5/2003 | Imasaki | B21C 1/00 138/142 |
| 2003/0102045 | A1* | 6/2003 | Takahashi | B21D 26/033 138/143 |
| 2004/0132228 | A1 | 7/2004 | Magno et al. | |
| 2007/0132228 | A1 | 6/2007 | Montague | |
| 2016/0207086 | A1* | 7/2016 | Silveira E Silva | F16L 58/00 |

FOREIGN PATENT DOCUMENTS

| | | |
|---|---|---|
| GB | 2521218 | 6/2015 |
| JP | S 55-14122 | 1/1980 |
| WO | WO 97/34101 | 9/1997 |

OTHER PUBLICATIONS

API Specification 17J, "Specification for Unbonded Flexible Pipe," American Petroleum Institute, May 2014.

API Recommended Practice 17B, "Recommended Practice for Flexible Pipe," American Petroleum Institute, May 2014.

API Recommended Practice 1111, "Design, Construction, Operation, and Maintenance of Offshore Hydrocarbon Pipelines," American Petroleum Institute, Sep. 2015.

* cited by examiner

IMPROVING THE BENDING BEHAVIOUR OF MECHANICALLY-LINED RIGID PIPE

This invention relates to the challenges of bending a lined rigid pipe, for example during spooling procedures before reel-laying a subsea pipeline used in the oil and gas industry. The invention is particularly concerned with improving the bending behaviour of mechanically-lined pipe or 'MLP', as opposed to 'clad' pipe whose liner is instead bonded to an outer pipe chemically or metallurgically.

Rigid subsea pipelines are commonly formed of lengths of steel pipe—'pipe joints'—that are welded together end-to-end. In some cases, pipe joints are welded together offshore aboard an installation vessel as the pipeline is laid by S-lay or J-lay methods. In other cases, pipe joints are welded together into pipe stalks onshore at a spoolbase or yard and then the pipe stalks are welded together end-to-end to spool the prefabricated pipeline onto a reel. The spooled pipeline is then transported offshore for laying in a reel-lay operation. When spooling, bending of the pipeline along its length extends beyond elastic limits into plastic deformation that must be recovered by subsequent straightening processes during unspooling when laying.

It is important to understand that in the subsea oil and gas industry, the terms 'rigid' and 'flexible' as applied to pipes have clear meanings that differ in important respects from general language. For example, nominally 'rigid' pipes have enough flexibility to be bent if a minimum bend radius is observed. Yet, such pipes are not regarded in the industry as being 'flexible'.

Flexible pipes used in the subsea oil and gas industry are specified in API (American Petroleum Institute) Specification 17J and API Recommended Practice 17B. The pipe body is composed of a composite structure of layered materials, in which each layer has its own function. Typically, polymer tubes and wraps ensure fluid-tightness and thermal insulation. Conversely, steel layers or elements provide mechanical strength; for example, interlocked steel tapes form a carcass or pressure vault and a tensile armour is formed of helically-wound wire. Flexible pipes are terminated and assembled by end fittings. Unlike rigid pipelines that are fabricated by welding together multiple pipe joints, flexible pipelines are typically manufactured continuously to the desired length between their end fittings.

The structure of a flexible pipe allows a large bending deflection without a similarly large increase in bending stresses. The bending limit of the composite structure is determined by the elastic limit of the outermost plastics layer of the structure, typically the outer sheath, which limit is typically 6% to 7% bending strain. Exceeding that limit causes irreversible damage to the structure. Consequently, the minimum bending radius or MBR of flexible pipe used in the subsea oil and gas industry is typically between 3 and 6 meters.

Conversely, rigid pipes used in the subsea oil and gas industry are specified in API Specification 5L and Recommended Practice 1111. In contrast to flexible pipes, a rigid pipe usually consists of or comprises at least one pipe of solid steel or steel alloy. However, additional elements can be added, such as an internal liner layer or an outer coating layer. Such additional elements can comprise polymer, metal or composite materials. Rigid pipe joints are typically terminated by a bevel or a thread, and are assembled end-to-end by welding or screwing them together.

The allowable in-service deflection of rigid steel pipe is determined by the elastic limit of steel, which is around 1% bending strain. Exceeding this limit caused plastic deformation of the steel. It follows that the MBR of rigid pipe used in the subsea oil and gas industry is typically around 100 to 300 meters depending upon the cross-sectional dimensions of the pipe. However, slight plastic deformation can be recovered or rectified by mechanical means, such as straightening. Thus, during reel-lay installation of a rigid pipeline made up of welded rigid pipe joints, the rigid pipeline can be spooled on a reel with a typical radius of between 8 and 10 meters. This implies a bending strain above 2% for conventional diameters of rigid pipes, requiring the pipeline to be straightened mechanically upon unspooling.

In S-lay installation, a rigid pipeline is launched horizontally from a vessel and then over a stinger that supports an overbend of the pipeline, from which the pipeline curves down through the water to a sag bend leading to a touchdown point on the seabed. In the variant Steep S-lay, the rigid pipeline undergoes a deflection through approximately 90° in the overbend to a near-vertical departure angle as it leaves the stinger. In J-lay installation, pipe joints are lifted into a near-vertical orientation for welding to the end of the pipeline, which hangs near-vertically from the vessel.

It will be apparent that whether S-lay, J-lay or reel-lay methods are employed to lay rigid pipe, the pipeline will experience substantial stresses and strains. Stresses and strains are experienced after a pipeline is laid, for example due to thermal cycling in use. However, stresses and strains are particularly prevalent before and during laying as the pipeline is spooled onto a reel, straightened, deflected through an overbend or deflected through a sag bend, as the case may be, during spooling and/or laying.

Stresses and strains are most severe when spooling a rigid pipeline onto a reel and subsequently straightening that pipeline, as those operations involve plastic deformation of the steel of the pipe as mentioned above. Particular problems arise when bending a lined rigid pipe, which may be required for handling well fluids containing corrosive agents such as hydrogen sulphide and chlorides.

A lined rigid pipe typically comprises a load-bearing, thick-walled, high-strength outer pipe of low-alloy carbon steel, lined with a thin-walled liner sleeve of a corrosion-resistant alloy (CRA). An example of a CRA is a stainless steel alloy such as Inconel™. The outer pipe resists buckling during spooling and unspooling and resists hydrostatic pressure when underwater. Conversely, the inner sleeve provides little mechanical strength, being just a few millimeters thick, but it protects the outer pipe from corrosive constituents of fluids carried by the pipe in use.

The use of two different materials in this way recognises that a pipe made entirely from corrosion-resistant material would be prohibitively expensive and yet could lack the essential mechanical properties that are provided by the strong outer wall of a lined pipe.

CRA-lined bimetallic pipes take two forms. The first is clad pipe, in which an internal CRA liner sleeve is metallurgically or chemically bonded to the outer pipe. The second, and the field of the present invention, is MLP. In MLP, an interference fit between the liner sleeve and the outer pipe fixes the liner sleeve without metallurgical bonding. An example of MLP is supplied by H. Butting GmbH & Co. KG of Germany under the trade mark 'BuBi'.

To produce a length of MLP, a tubular liner sleeve is expanded until it is mechanically fixed to a surrounding outer pipe. The liner sleeve is inserted telescopically into the outer pipe as a sliding fit and both are expanded radially by radially-outward lining pressure applied within the liner sleeve. The expanding liner sleeve undergoes radially-outward plastic deformation to apply radial expansion force to the outer pipe, which undergoes radially-outward elastic deformation as a result. Once the internal pressure in the liner sleeve is relaxed, radially-inward elastic shrinkage of the outer pipe onto the plastically-expanded liner sleeve effects a mechanical bond between the outer pipe and the liner sleeve.

Thus, the internal lining pressure applied to the liner sleeve breaches the elastic limit of the liner sleeve and so causes plastic deformation of the liner sleeve in a radially outward direction against the inner surface of the outer pipe. The outer pipe also expands under radially outward pressure exerted through the liner sleeve. However as the outer pipe is stronger than the liner sleeve, it does not undergo plastic deformation.

Consequently, the outer pipe is first elastically deformed in a radially outward direction and then returns toward its original state when pressure is released. Conversely, the plastically-expanded liner sleeve is placed under residual compressive stress in the radially inward direction due to elastic contraction of the surrounding outer pipe when pressure is released.

FIG. 1 is a stress-strain diagram showing the transition between elastic and plastic deformation of the liner sleeve during radial expansion. The invention aims to apply sufficient pressure in a radially-outward direction, as shown at point A in FIG. 1 where after pressure is relieved, the liner sleeve is just at or slightly beyond its elastic limit. This maximises the bonding force between the liner sleeve and the outer pipe. In contrast, where the radially-outward pressure is not sufficient, the liner remains in the elastic domain after pressure is relieved as shown at point B in FIG. 1. This generates inadequate bonding force between the liner sleeve and the outer pipe.

The liner sleeve may be expanded hydraulically by pressurising water inside the telescopically-assembled liner sleeve and outer pipe. Another way of expanding the liner sleeve is to push the liner mechanically using a system of outwardly-acting internal jacks. US 2007/0132228 describes expanding a liner sleeve by applying internal pressure to successive short sections of the liner sleeve along the length of a pipe assembly using a mandrel.

Hydraulic expansion of the liner sleeve is illustrated in FIG. 2 of the drawings. In this method, a lined pipe joint 10 comprising an outer pipe 12 of carbon steel containing a tubular liner sleeve 14 of CRA is firmly clamped in a backing assembly 16 that surrounds the pipe joint 10. The open end of the pipe joint 10 is sealed by an end-plug 18 that fits tightly within the liner sleeve 14. Next, the interior of the liner sleeve 14 is filled with water 20, for example through a port 22 extending through the plug 18. The water 20 is then pressurised, using a pumping apparatus shown schematically at 24, to push the liner sleeve 14 radially outwardly against the inner surface of the outer pipe 12.

DE 102010044463 describes a typical method for manufacturing MLP. Similarly, U.S. Pat. No. 4,069,573 discloses expansion of a liner within an outer pipe using various equipment, although in that example the outer pipe is also expanded plastically. GB 2476457 and JP S5514122 also describe known methods for manufacturing MLP.

Once an outer pipe has been mechanically lined in this way, internal pressurisation of the lined pipe joint assembly may be performed in subsequent operations at a lower pressure, at which the liner sleeve remains below its elastic limit. One example of internal pressurisation is when hydrotesting the lined pipe joint. Another example of internal pressurisation is when pre-tensioning the lined pipe joint to relieve residual stress concentrations resulting from welding—a process called 'calibration'. A useful side effect of lining and subsequent operations may be to correct flaws of pipe ends such as ovalisation.

MLP benefits from an economical production process that makes it much less expensive than clad pipe. This can save tens of millions of US dollars in a large subsea project, considering the many kilometers of lined pipe that may be required. However, MLP is susceptible to problems during spooling that make it challenging to use in some reel-lay applications. Briefly, MLP suffers from the possibility of localised slippage of the liner sleeve relative to the outer pipe when the lined pipe joint is bent enough to cause plastic deformation.

Specifically, when bending MLP as when spooling a pipeline, the thick-walled outer pipe may be structurally stable or undergo slight ovalisation while the thin-walled inner liner sleeve of lower yield strength suffers significant deformation under the combined action of bending and external pressure from the outer pipe. This deformation manifests itself as buckling or wrinkling of the liner sleeve, especially around the intrados or inner curve of the pipe bend and particularly beside the girth welds between pipe joints. A wrinkled liner sleeve may hinder the smooth flow of well fluids, may decrease fatigue life due to stress concentration and may preclude effective pigging of the pipeline.

After the outer pipe has been mechanically lined, the ends of the lined pipe joint must be prepared. As a first step, the end extremities of the pipe joint are generally cut away in case they have not been subjected to sufficient bonding pressure, especially because of the plugs that sealed pressurised water inside the liner sleeve. This problem is illustrated in FIG. 3, which shows the lined pipe joint 10 after hydraulic expansion of the liner sleeve 14 when the end-plug 18 of FIG. 1 has been removed and the water 20 has been drained.

It will be apparent from FIG. 3 that where the liner sleeve 14 was exposed to pressurised water 20, a mechanical bond 26 has been created by interference between the liner sleeve 14 and the outer pipe 12. However, at the end portion where the end-plug 18 shielded the liner sleeve 14 from the pressurised water 20, there is no effective mechanical bond between the liner sleeve 14 and the outer pipe 12. This portion of the lined pipe joint 10 must therefore be cut away.

Further to reduce the risk of the liner sleeve 14 slipping relative to the outer pipe 12, the liner sleeve 14 and the outer pipe 12 of MLP are typically preliminarily bonded together at the ends of the lined pipe joint 10. The liner sleeve 14 and the outer pipe 12 can be chemically bonded or metallurgically bonded by being welded together, for example as discussed in WO 97/34101.

This extra bonding is known in the art as an 'overlay' and is also shown schematically in FIG. 4 of the drawings as reference numeral 28, applied after the end portion of the lined pipe joint 10 outboard of the mechanical bond 26 has been cut away. Another example of overlay manufacturing is described in U.S. Pat. No. 4,556,240. The typical longitudinal length of the overlay is 50 mm, although part of this overlay may be removed at the end of the lined pipe joint. A seal weld 30 at the end of the lined pipe joint 10 typically finishes connection of the liner sleeve 14 to the outer pipe 12.

Known methods for manufacturing MLP have three principal drawbacks:
firstly, cutting away the ends of the lined pipe joint is costly and time-consuming;

secondly, when the lined pipe joint is part of a pipe string that experiences a high bending strain (to recap, typically 2% bending strain during spooling for pipelaying by the reel-lay method), the bonding between the liner sleeve and the outer pipe may loosen, especially near the ends at the interface with the overlay; and thirdly, if the walls of the liner sleeve are relatively thick (say, thicker than 3.5 mm), the pressure required to expand the liner sleeve to ensure sufficient bonding force between the liner sleeve and the outer pipe can become huge. Indeed, the required pressure may exceed pressure limits authorised by safety rules in workshops or factories.

Typically, if a liner sleeve is say 5 mm thick, conventional pressures may not breach the elastic limit of the liner sleeve across its full surface area. In service, therefore, gaps may appear at the interface between the liner sleeve and the overlay, behind the seal weld. Stress repartition in the layers of the lined pipe joint is not sufficiently known.

When using a conventional method for making MLP, a typical value for the resulting bonding gap between the liner sleeve and the outer pipe is 73 μm. Such a gap is not acceptable when a lined pipe joint has to be bent plastically along its length with a tight radius of curvature, as in spooling for reel-lay, because de-bonding may occur. A bonding gap between 1 μm and 10 μm, at least in the end portions of the lined pipe joint, is preferred for this purpose.

U.S. Pat. No. 3,562,887 describes explosive expansion of a liner sleeve against an outer pipe. This method does not allow the pressure exerted on and by the liner sleeve to be controlled effectively. Consequently, there is a high risk of bursting or damaging the liner sleeve or the outer pipe.

Against this background, the invention involves adding a step of increasing mechanical or hydraulic pressure locally during manufacture of a mechanically-lined pipe joint. This improves mechanical bonding between the layers of the pipe joint at critical locations, for example at the interface between the mechanical bond and an overlay.

In preferred embodiments, pressure is increased locally to expand the outer pipe—not only the liner sleeve—just above its elastic limit. When that pressure is subsequently released, the outer pipe can still contract elastically onto the thinner liner sleeve. This extends an effective mechanical bond, already made along part of the length of the lined pipe joint, along substantially the full length of the assembly. It also allows a strengthened mechanical bond to be provided at critical locations such as the interface with an overlay.

From one aspect, the invention resides in a method of making mechanically-lined rigid pipe. That method comprises:

in a primary radial expansion, expanding an outer pipe by plastically expanding a liner sleeve against an inner surface of the outer pipe, under lining pressure applied internally to the liner sleeve;

relieving the lining pressure to permit elastic radial contraction of the outer pipe around the plastically-expanded liner sleeve, that contraction making a mechanical bond between the outer pipe and the liner sleeve; and subsequently, performing a secondary radial expansion of the outer pipe by local plastic expansion of the liner sleeve against the inner surface of the outer pipe, under fixing pressure applied internally to the liner sleeve.

The secondary radial expansion may be performed either to make or to strengthen a mechanical bond between the liner sleeve and the outer pipe. For optimal location of the liner sleeve within the outer pipe, it is preferred that the fixing pressure is greater than the lining pressure and that the outer pipe is at least partially expanded plastically during the secondary expansion.

The fixing pressure is suitably applied internally to the liner sleeve at an end portion of the mechanically-lined pipe. In that case, the mechanical bond between the outer pipe and the liner sleeve is suitably at a body portion of the mechanically-lined pipe inboard of the end portion at which secondary radial expansion is performed.

The fixing pressure may, for example, be applied to the liner sleeve over a length of less than 50 cm of the mechanically-lined pipe. An overlay may also be added at the end portion, at which the liner sleeve is chemically or metallurgically bonded to the outer pipe.

An expander apparatus is suitably inserted into the end portion of the mechanically-lined pipe after relieving the lining pressure. The expander apparatus is then activated after insertion to apply the fixing pressure to the liner sleeve. An external die is suitably placed around the outer pipe before performing that secondary radial expansion.

The inventive concept encompasses mechanically-lined rigid pipe made by the method of the invention. In particular, the inventive concept encompasses a rigid pipe joint of mechanically-lined pipe comprising an outer pipe that surrounds a plastically-expanded liner sleeve and that is mechanically bonded to the liner sleeve by elastic radial contraction, the pipe joint comprising at least one end portion extending inwardly from an open end and a body portion inboard of the end portion. The body portion has a first, lesser bonding pressure between the outer pipe and the liner sleeve. The, or each, end portion has a second, greater bonding pressure between the outer pipe and the liner sleeve.

The body portion suitably comprises elastically-expanded outer pipe whereas the end portion suitably comprises plastically-expanded outer pipe. A bonding gap between the liner sleeve and the outer pipe is preferably no greater than 10 μm, at least at the or each end portion.

In summary, the invention provides a method of making mechanically-lined pipe that comprises primary expansion by plastically expanding a liner sleeve within an outer pipe, under lining pressure applied internally to the liner sleeve. On relieving the lining pressure, elastic radial contraction of the outer pipe makes a mechanical bond between the outer pipe and the liner sleeve. Then, secondary expansion of the outer pipe is performed under fixing pressure, which may be greater than the lining pressure, applied internally to the liner sleeve preferably at an end portion of the pipe. This makes or strengthens a mechanical bond between the liner sleeve and the outer pipe.

A resulting pipe joint comprises an end portion and a body portion inboard of the end portion. The body portion has a first, lesser bonding pressure between the outer pipe and the liner sleeve. The end portion has a second, greater bonding pressure between the outer pipe and the liner sleeve.

Thus, the invention improves a known method of making MLP by adding a second, local expansion step, preferably with significantly higher pressure than a preceding expansion step performed along most or all of the length of a lined pipe joint. This avoids cutting away an inadequately-bonded end portion of the lined pipe joint. To the contrary, the invention instead improves mechanical bonding of the end portion to match or improve the strength of a mechanical bond created along the remainder of the lined pipe joint.

In preferred aspects, the invention extends a known method for manufacturing mechanically-lined steel pipe, which known method comprises the following steps:

a. inserting a steel liner pipe, preferably of CRA, inside a steel outer pipe, preferably of carbon steel;
b. with the outer pipe inside a backing support, expanding the liner pipe above its elastic limit by applying a first pressure within the liner pipe until the liner pipe bears against the interior of the outer pipe;
c. relieving the first pressure; and
d. adding a chemically- or metallurgically-bonded overlay extending a short distance inwardly from an end of the pipe.

The invention inserts an additional step between steps c. and d. That additional step comprises locally expanding an end portion of the lined pipe by applying a second pressure within the liner pipe that is substantially greater than the first pressure. The additional step suitably involves the following operations, which may be performed successively or simultaneously for each end portion of the lined pipe:

placing a die ring around the pipe end portion to provide mechanical backing;
inserting a local expansion apparatus into the pipe end portion; and
after relieving the second pressure, removing the die ring and the local expansion apparatus.

If the bonding gap between the liner sleeve and the outer pipe is sufficiently tight, for example below 1 µm, application of an overlay as per step d. above could theoretically be omitted. This is on the basis that improved bonding between the liner sleeve and the outer pipe could then perform the mechanical functions of the overlay. Practically, however, an overlay is useful to provide a reference reflecting area for inspection by non-destructive testing of subsequent welds between abutting pipe joints.

Preferably, the first pressure is sufficient to expand the liner pipe at least to its elastic limit. Also, the second pressure acting via the expanding liner pipe is preferably sufficient to expand the outer pipe at least to its elastic limit.

The first and second pressures may be exerted hydraulically or mechanically. Both pressures may be exerted hydraulically or both may be exerted mechanically. Alternatively, one pressure may be exerted hydraulically and the other may be exerted mechanically.

During local expansion, the second pressure may be applied to a minor portion of the lined pipe, typically over an application length of less than 50 cm extending inwardly from an end of the pipe.

The invention improves bonding between layers of mechanically-lined steel pipe by preparing a mechanically-lined pipe section and mechanically reinforcing the connection between the layers at end portions of the pipe section. Mechanical reinforcement involves installing a die ring around an end portion; installing internal pressurising equipment inside the end portion; operating the internal pressurising equipment to increase internal pressure locally at least until the elastic limit of a liner layer is reached; and relieving the internal pressure. The internal pressurising equipment may apply internal pressure to the inner surface of the liner layer hydraulically or mechanically. The internal pressure acting via the expanding liner layer is preferably increased sufficiently to expand a surrounding outer layer of the pipe section at least to its elastic limit.

The invention employs apparatus for improving bonding between layers of mechanically-lined steel pipe, which apparatus comprises a die ring arranged to be installed around an end portion of the pipe and internal pressurising equipment arranged to be inserted inside the end portion to act in opposition to the die ring. The internal pressurising equipment is configured to apply sufficient internal pressure to a liner layer of the pipe that expansion of the liner layer can expand a surrounding outer layer of the pipe section at least to its elastic limit. Radially-outward pressure pushes the end portion or end zone of a lined pipe joint against the surrounding die ring to control outward deformation of that portion or zone.

In order that the invention may be more readily understood, reference will now be made, by way of example, to the accompanying drawings in which.

Figure 1:
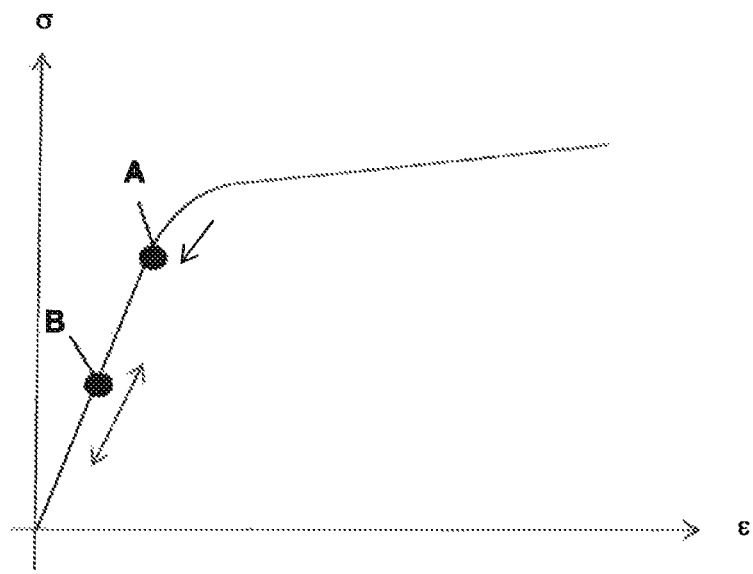
FIG. 1 is a stress-strain diagram showing optimal and sub-optimal degrees of radial expansion of the liner sleeve when producing MLP.
Figure 3:
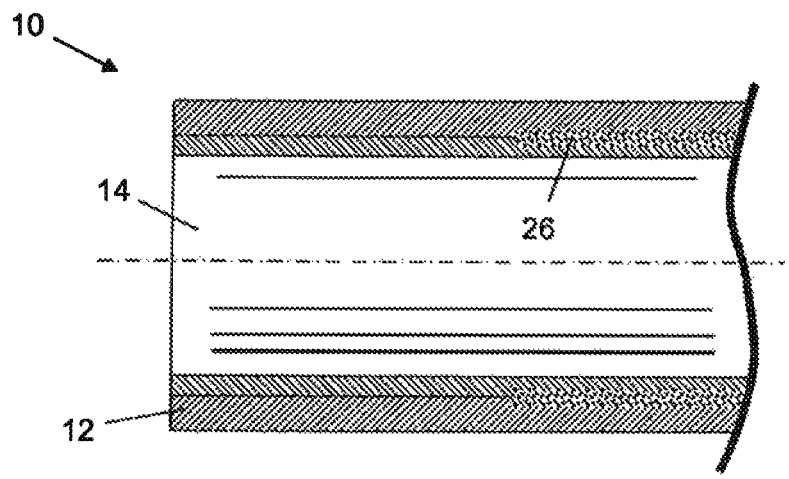
Figure 4:
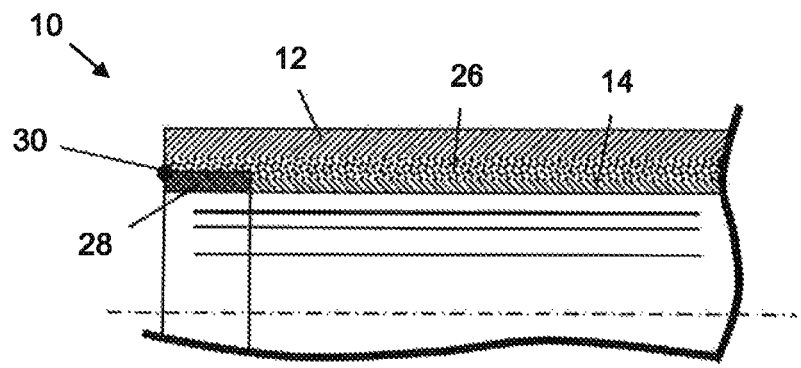
Figure 5A:
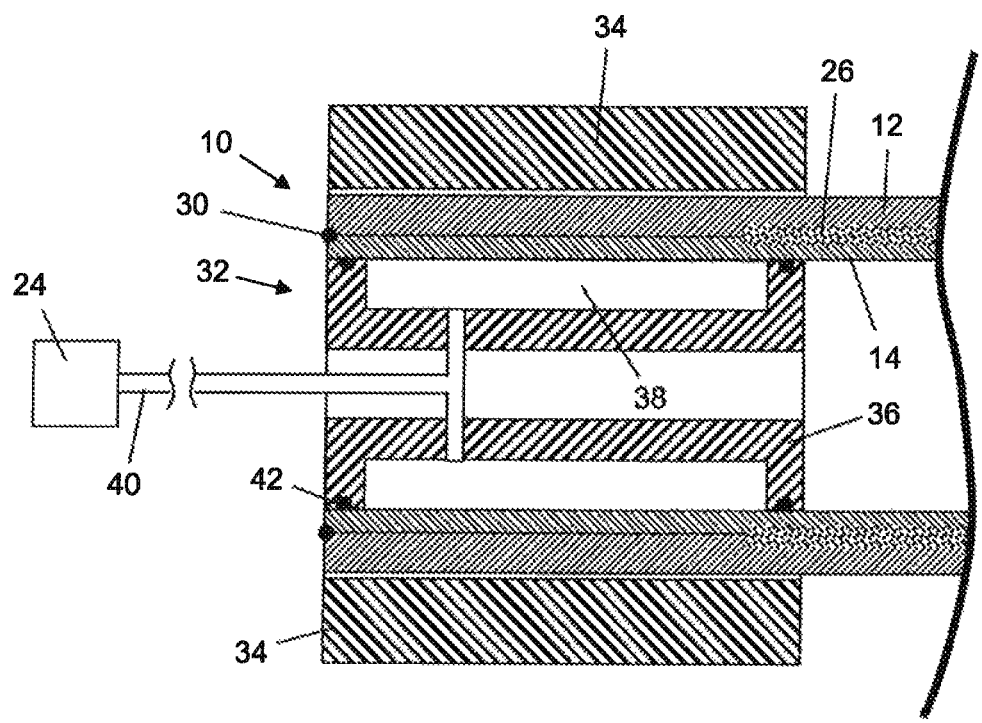
Figure 5B:
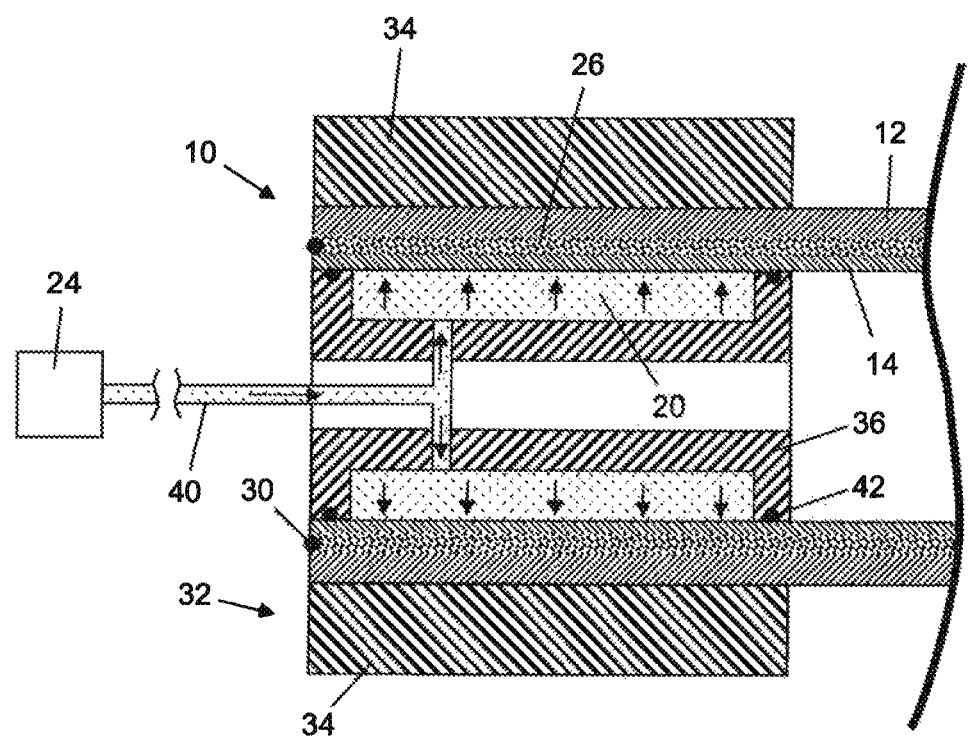
Figure 6:
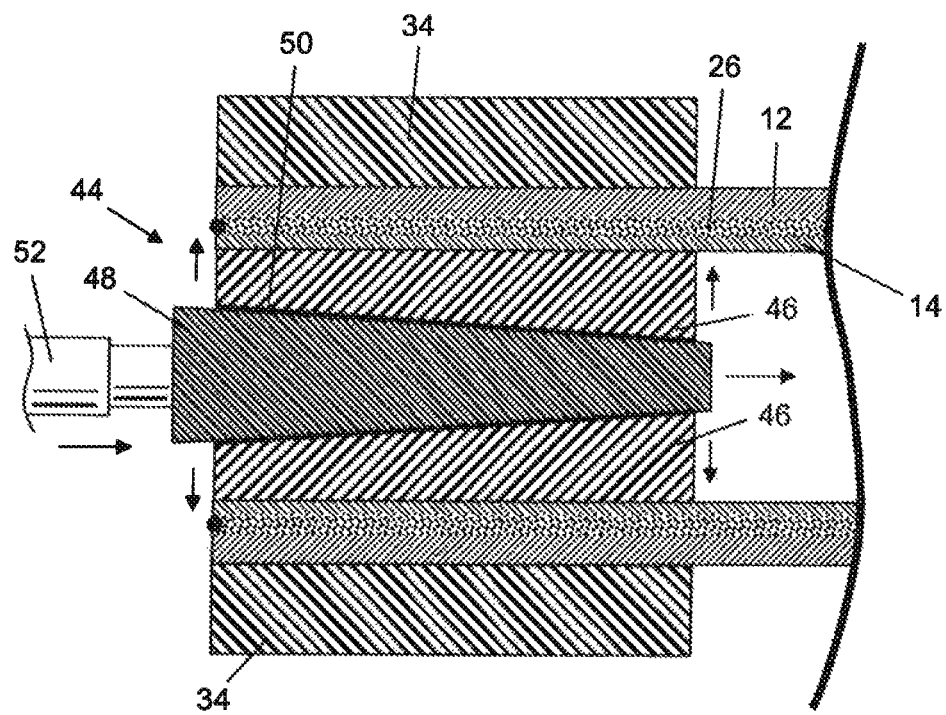
Figure 7:
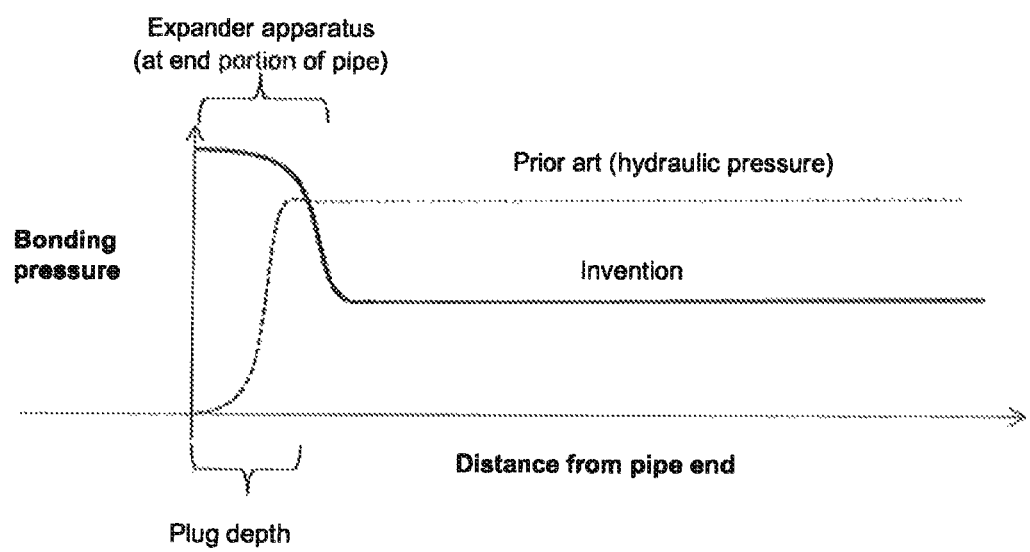

FIG. 3 corresponds to FIG. 1 but shows the lined pipe joint when an end-plug has been removed after hydraulic expansion of the liner sleeve, as known in the prior art and as discussed in the introduction;

FIG. 4 is a schematic longitudinal sectional view of a lined pipe joint, showing an overlay at which the liner sleeve is chemically or metallurgically bonded to the outer pipe, as known in the prior art and as discussed in the introduction;

FIGS. 5a and 5b are sequential schematic longitudinal sectional views of a hydraulic expander apparatus performing localised expansion of the liner sleeve near the end of the lined pipe joint in accordance with the invention;

FIG. 6 is a schematic longitudinal sectional view of a mechanical expander apparatus performing localised expansion of the liner sleeve near the end of the lined pipe joint in accordance with the invention; and FIG. 7 is a graph showing bonding force exerted through the liner sleeve plotted against distance from one end of the lined pipe joint.

Reference has already been made to FIGS. 1 to 4 of the drawings to explain the prior art background. The invention will now be described with reference to FIGS. 5a to 7, which use like reference numerals for like parts.

Referring next, then, to FIGS. 5a and 5b, these drawings show expander apparatus 32 in accordance with the invention for expanding the liner sleeve 14 at the end portion of the lined pipe joint 10. The lined pipe joint 10 may have been made using conventional techniques involving the application of an internal lining pressure to expand the liner sleeve 14. FIG. 5a shows the expander apparatus 32 after being placed on the lined pipe joint 10 but before being activated and FIG. 5b shows the lined pipe joint 10 after the expander apparatus 32 has been activated to apply a fixing pressure that expands the liner sleeve 14 at the end portion.

The expander apparatus 32 shown in FIGS. 5a and 5b comprises an annular backing ring or die 34, suitably of two or more parts, that slides or clamps around the outside of the end portion of the pipe joint 10. The backing ring 34 determines the final outer diameter of the lined pipe joint 10 after radial expansion allowed by a small clearance or gap between the backing ring 34 and the outer pipe 12, as is evident in FIG. 5a. The expander apparatus 34 further comprises a cylindrical internal hydraulic expander tool 36 that fits closely inside the end portion of the pipe joint 10 in longitudinal alignment with the backing ring 34.

Figure 2:
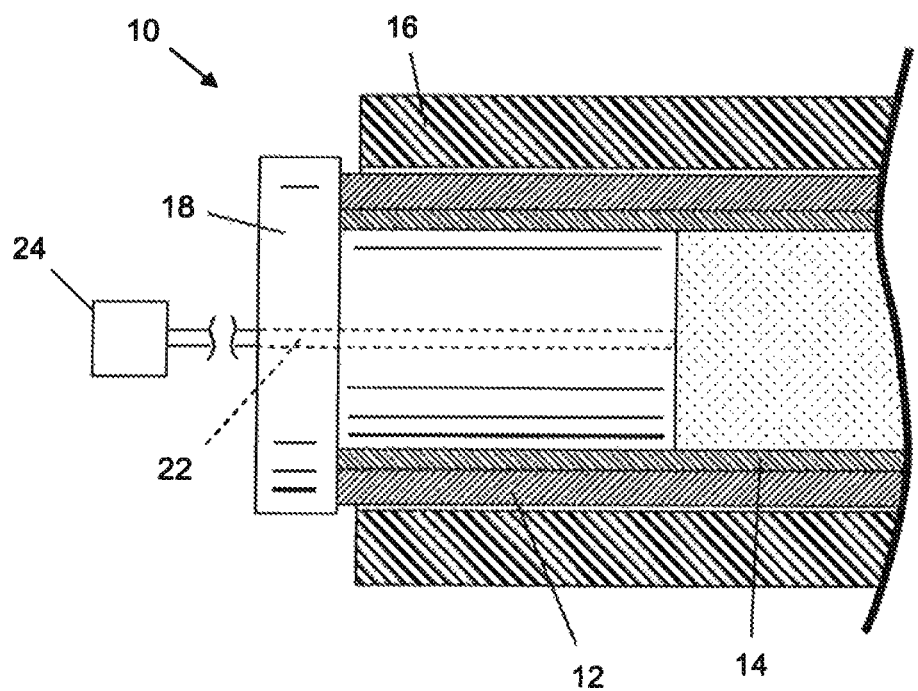
FIG. 2 is a schematic longitudinal sectional view of a lined pipe joint about to undergo hydraulic expansion of a liner sleeve to produce MLP, as known in the prior art and as discussed in the introduction.

The end portion of the pipe joint 10 corresponds to the depth of the end-plug 18 in the open end of the lined pipe joint 10, where the now removed end-plug 18 shielded the liner sleeve 14 from pressurised water 20 during expansion of the liner sleeve 14 as shown in FIG. 2. As FIGS. 3 and 5a show, the result is that an effective mechanical bond is lacking between the liner sleeve 14 and the outer pipe 12 at the end portion. In prior art practice, this portion of the lined pipe joint 10 would be cut away. In contrast, in accordance with the invention, an enhanced mechanical bond between the liner sleeve 14 and the outer pipe 12 is instead created at the end portion of the lined pipe joint 10 by localised greater secondary expansion of the liner sleeve 14. As in the prior art, a seal weld 30 between the liner sleeve 14 and the outer pipe 12 may be provided at the end of the lined pipe joint 10 as shown.

Thus, the expander tool 36 shown in FIGS. 5a and 5b defines an annular chamber 38 for receiving pressurised water 20 via a line 40 from a pumping apparatus 24. The chamber 38 is sealed to the inside of the liner sleeve 14 by O-rings 42 at the ends of the expander tool 36. When the expander tool 36 is inserted into the end portion of the lined pipe joint 10, the chamber 38 extends longitudinally to approximately the same extent as, and preferably slightly further than, the depth of the end-plug 18. Typically, that depth is less than 50 cm. Thus, the chamber 38 encompasses the end of the mechanical bond 26 left after expansion of the liner sleeve 14 within the outer pipe 12 as shown in FIG. 5a.

When the expander tool 36 is activated, water 20 is introduced into the chamber 38 and is pressurised to a high fixing pressure, to the extent that the portion of the liner sleeve 14 aligned with the expander tool 36 expands plastically into tight mechanical engagement with the outer pipe 12. Consequently, the mechanical bond 26 between the liner sleeve 14 and the outer pipe 12 then extends to the end of the lined pipe joint 10 as shown in FIG. 5b.

FIG. 6 shows a variant of the expander apparatus shown in FIG. 5. Here, the hydraulic expander tool 36 of FIGS. 5a and 5b is replaced by a mechanical expander tool 44. The mechanical expander tool 44 comprises jaws 46 spaced circumferentially around a distally-tapered cam member 48 that is centred on the central longitudinal axis of the lined pipe joint 10. The jaws 46 and the cam member 48 have opposed complementary frusto-conical wedge surfaces 50, those of the jaws 46 being female or concave and that of the cam member 48 being male or convex.

The wedge surfaces 50 interact such that when the cam member 48 is driven longitudinally into the end of the lined pipe joint 10 by a ram 52, the jaws 46 are forced radially outwardly as shown to apply radially-outward pressure to the inside of the liner sleeve 14. As with the chamber 38 of the hydraulic expander tool 36 of FIGS. 5a and 5b, the jaws 46 of the mechanical expander tool 44 extend longitudinally to approximately the same extent as, and preferably slightly further than, the depth of the end-plug 18.

As in the prior art shown in FIG. 4, a chemically- or metallurgically-bonded overlay may be provided extending inwardly a short distance from each end of the lined pipe joint 10 to complete the inner liner layer. Such an overlay has been omitted from FIGS. 5a, 5b and 6.

Finally, FIG. 7 is a graph showing bonding pressure between the outer pipe 12 and the liner sleeve 14, plotted against distance from an open end of the lined pipe joint 10. FIG. 7 reflects the preference that an expander tool 36, 44 at the end portion of the lined pipe joint 10 extends along the lined pipe joint 10 from the open end slightly further than depth of the end-plug 18.

It will be noted from the dotted line in FIG. 7 how the bonding pressure of prior art solutions is high along most of the length of the lined pipe joint 10 at its major central body portion but is inadequate in the minor end portion along the depth of the end-plug 18 from the open end of the lined pipe joint 10. In accordance with the invention as represented by the solid line in FIG. 7, the expander tool 36, 44 applies enough radially-outward force to the liner sleeve 14 in this end portion that the bonding pressure is sufficiently high along, substantially, the full length of the lined pipe joint 10.

Preferably, as shown by the solid line in FIG. 7, the bonding pressure in the end portion of the lined pipe joint 10 exceeds the bonding pressure along the remainder of the lined pipe joint 10, particularly its major central body portion as shown by the horizontal portion of the dotted line in FIG. 7. This is achieved by locally increasing the radially-outward pressure applied within the end portion by virtue of the expander tool 36, 44, relative to the radially-outward pressure that was applied within the body portion during initial mechanical lining of the pipe joint 10. For example, in the hydraulic expander tool 36 shown in FIGS. 5a and 5b, the pressure of the water 20 is increased relative to the pressure of the water 20 that was applied hydraulically during initial mechanical lining of the pipe joint 10 as shown in FIG. 2.

It will be recalled that the liner sleeve 14 expands beyond its elastic limit by virtue of the lower internal pressure applied along the major central body portion of the lined pipe joint 10. It therefore follows that the liner sleeve 14 will also be expanded beyond its elastic limit by the higher internal pressure applied along the minor end portion of the lined pipe joint 10. Thus, under the higher internal pressure applied at the end portion by the expander apparatus 32, the liner sleeve 14 will experience a greater extent of radial expansion relative to the body portion, as permitted by clearance of the outer pipe 12 within the surrounding backing ring 34.

Until clearance of the outer pipe 12 within the surrounding backing ring 34 is taken up, plastic radial expansion of the liner sleeve 14 is constrained by inward pressure from the outer pipe 12, whose radial expansion is driven by contact from the expanding liner sleeve 14. Initially, radial expansion of the outer pipe 12 at the end portion of the lined pipe joint 10 is in the elastic domain, which mirrors the transient radial expansion of the outer pipe 12 along the central body portion of the lined pipe joint 10 during mechanical lining procedures of the prior art. However in view of the increased internal pressure within the end portion of the lined pipe joint 10, the liner sleeve 14 when undergoing plastic expansion may also expand the outer pipe 12 to or just beyond its elastic limit at the end portion. This strengthens the mechanical bond between the outer pipe 12 and the liner sleeve 14 at the end portion, which is helpful to resist wrinkling of the liner sleeve 14 at the critical interface between the mechanical bond and an overlay that may subsequently be applied at the end of the lined pipe joint 10.

The invention claimed is:

1. A method of making mechanically-lined rigid pipe, comprising:
   inserting an end plug into an end portion of an outer pipe to seal an open end of the outer pipe, the outer pipe surrounding a liner sleeve;
   in a primary radial expansion, expanding the outer pipe by plastically expanding the liner sleeve against an inner surface of the outer pipe, under a lining pressure applied internally to the liner sleeve while the end plug shields the liner sleeve within the end portion of the outer pipe from plastic expansion under the lining pressure;
   relieving the lining pressure to permit elastic radial contraction of the outer pipe around the plastically-expanded liner sleeve, that contraction making a mechanical bond between the outer pipe and the liner sleeve at a body portion of the outer pipe inboard of the end portion that contains the end plug;

removing the end plug from the end portion of the outer pipe;

placing an external annular backing ring around the end portion of the outer pipe; and subsequently, performing a secondary radial expansion of the end portion of the outer pipe by local plastic expansion of the liner sleeve within the end portion of the outer pipe against the inner surface of the end portion of the outer pipe, under a fixing pressure applied internally to the liner sleeve within the end portion of the outer pipe, wherein the fixing pressure is greater than the lining pressure.

2. The method of claim 1, wherein the outer pipe is at least partially expanded plastically during the secondary expansion.

3. The method of claim 1, followed by applying an overlay at which the liner sleeve is chemically or metallurgically bonded to the outer pipe.

4. The method of claim 1, comprising inserting an expander apparatus into the end portion of the outer pipe after relieving the lining pressure, and activating the expander apparatus after insertion to apply the fixing pressure to the liner sleeve within the end portion of the outer pipe.

5. The method of claim 1, wherein the fixing pressure is applied to the liner sleeve over a length of less than 50 cm of the outer pipe.

6. The method of claim 1, wherein the secondary radial expansion is performed to make or to strengthen a mechanical bond between the liner sleeve and the outer pipe.

7. Mechanically-lined rigid pipe made by the method of claim 1.

* * * * *